United States Patent [19]

Resan

[11] Patent Number: 4,519,175

[45] Date of Patent: May 28, 1985

[54] LUBRICATED ROOFING MEMBRANE FASTENER

[75] Inventor: Stevan A. Resan, Carlisle, Pa.

[73] Assignee: Carlisle Corporation, Cincinnati, Ohio

[21] Appl. No.: 504,462

[22] Filed: Jun. 15, 1983

[51] Int. Cl.³ .............................................. E04D 5/14
[52] U.S. Cl. ...................................... 52/713; 52/741; 52/747; 52/410
[58] Field of Search ................ 52/410, 741, 747, 748, 52/595, 713; 285/94; 160/399, 380, 402; 24/113, 90 C, 461, 462

[56] References Cited

U.S. PATENT DOCUMENTS

| | | |
|---|---|---|
| 2,302,341 | 11/1942 | Nash . |
| 2,456,234 | 12/1948 | Young ................................ 285/94 |
| 2,640,238 | 6/1953 | Schuhr . |
| 2,888,730 | 6/1959 | Nash . |
| 3,426,412 | 2/1969 | Streng et al. . |

FOREIGN PATENT DOCUMENTS

P2433669.4  7/1974  Fed. Rep. of Germany .
2804962  8/1980  Fed. Rep. of Germany .

*Primary Examiner*—John E. Murtagh
*Attorney, Agent, or Firm*—Wood, Herron & Evans

[57] ABSTRACT

A three-piece fastener for securing a flexible roofing membrane to a roof without penetrating the membrane. The fastener includes an anchoring disc having a centrally located, upwardly-directed projection or button in the central portion thereof which preferably has a hollow inverted frusto-conical shape. The disc is screwed or nailed to a roof surface, and the roofing membrane laid over the disc. Thereafter, an externally threaded, tined retainer cap of resilient material, which forms a second element of the fastener, is snapped over the button with the membrane located therebetween. An internally threaded cover screws onto the tined retainer, preventing the retainer from popping off the button. The tined cap is lubricated with a permanent non-evaporating lubricant, such as silicon grease, to facilitate its use without damaging the membrane.

15 Claims, 3 Drawing Figures

LUBRICATED ROOFING MEMBRANE FASTENER

The present invention relates to a fastener for holding a flexible roofing membrane to a roof, and more particularly to a fastener and a method of holding a roofing membrane to a roof wherein stress on the membrane is reduced and rupture of the membrane is avoided.

There are many types of roofing systems used with various types of buildings. For larger buildings with generally flat roof surfaces, flexible sheet material, for example, EPDM rubber membrane is becoming increasingly popular due to its many advantages well known to those in the art. The membrane can be secured to the roof in three principal manners. It can be adhered with an adhesive, which is a time-consuming approach, or it can be nailed, which is not altogether satisfactory because it punctures the membrane which if sealed improperly could result in a leak. In accordance with a third scheme, non-penetrating mechanical fasteners are used. One particular mechanical fastening system is disclosed in German Patentschrifft No. 2,804,962. With this system, the membrane is held to an anchoring disc fastened to the roof. The anchoring disc, which includes a raised hollow inverted frusto-conical button, is screwed or nailed to the roof. The roof membrane is layed over the roof on top of the buttons. The membrane is held to the buttons by externally threaded, tined retainer caps. The tines of the retainer caps elastically deflect outwardly to fit over the button, sandwiching the membrane between the button and cap. An internally threaded cover screws onto the externally threaded retainer, holding the tines in place and preventing the retainer cap from popping off. Thus, the membrane is anchored to the roof without puncturing the membrane.

One problem encountered with this system is that the tined retainer is formed from a relatively hard plastic which can damage the membrane as it is forced over the membrane. Without some sort of lubrication, a membrane can easily be damaged. It has been the practice in the past to soak the retainer in warm soapy water immediately prior to installation. This provides the required lubrication to enable the retainer to snap over the membrane onto the anchor button without damaging the membrane.

The foregoing method of lubricating the tined retainer presents several problems. It requires the use of on-site labor which is expensive. Furthermore, this method is not suitable for use in cold temperatures. The soapy water simply freezes providing no lubrication. Further, after the fastener is applied, the soapy water evaporates and provides no effective lubrication. The roofing membrane is therefore not allowed to move relative to the fastener, and undesirable stress is created when the membrane expands and contracts due to thermal effects and/or wind-induced uplift forces.

In light of these problems, it is an object of the present invention to provide a non-puncturing fastener for holding a roofing membrane to a roof which does not require on-site lubrication of the fastener.

It is further an object of the present invention to provide a method of fastening a roofing membrane which can be practiced even at sub-freezing temperatures.

Further, it is an object of the present invention to provide a method to fasten a roofing membrane securely to a roof and yet permit the membrane to slide relative to the fastener.

These and other objects and advantages will be appreciated by reference to the following description and drawings in which.

Figure 1:
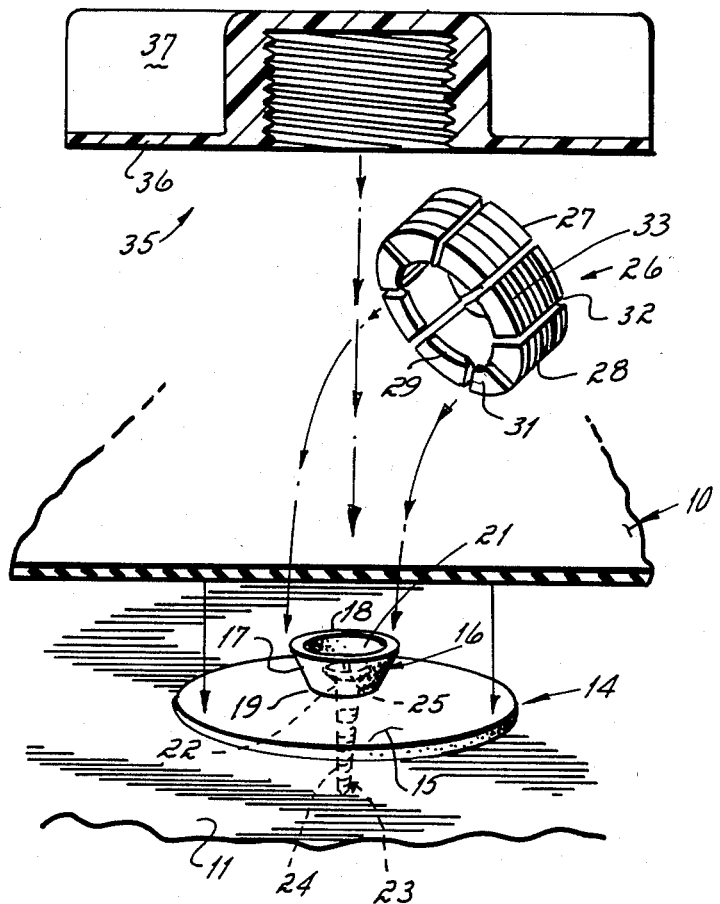
FIG. 1 is a diagrammatic depiction of the use of the novel fastener of the present invention.
Figure 2:
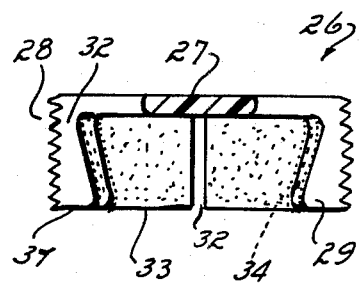
FIG. 2 is a vertical cross-section of the tined retainer cap of the present invention.
Figure 3:
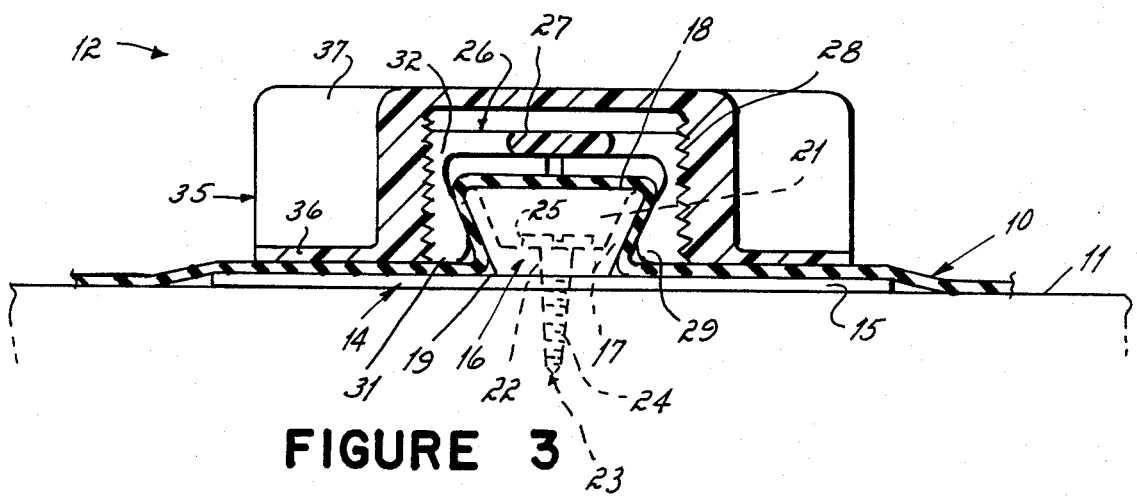
FIG. 3 is a cross-section view of the fastener of the present invention showing its use to secure a membrane to a roof.

As shown in FIG. 1, a roof surface 11 is provided to which a membrane 10 is to be secured. The roof surface can be formed from a variety of different substances, such as foamed concrete, plywood or sheet metal. The roofing membrane 10 is held in position on the roof surface 11 by a three-piece, non-penetrating fastener 12 (FIG. 3). All three pieces of the fastener are formed from a rigid material such as polyvinyl chloride. The first piece of the fastener 12 is a base or anchor disc 14. The anchor disc comprises a generally flat circular disc 15 having a hollow inverted, frusto-conical stub, projection or button 16 extending upwardly from the central portion of the disc 15. The wall 17 of the button 16 extends radially outwardly from the disc 15 so that the top or rim 18 of the raised portion is wider than its base 19. The button 16 further includes a hollow interior 21 adapted to receive the head of a screw or nail. A hole 22 extends from within the interior 21 directly through the center of disc 15. The hole is adapted to permit the shank of a screw or nail to pass through, but to prevent the head of the screw or nail from passing through.

The anchor disc 14 is screwed or nailed to the roof surface 11 by a fastener, such as screw 23, having a shank portion 24 extending through hole 22 through the center of the anchor 14 into the roof surface 11. The head 25 of screw 23 contacts the base 19 of the raised central portion of the anchor disc 14. A plurality of these anchor discs 14 are secured to the roof surface 11 at spaced intervals. After the required number of anchor discs are secured to the roof, the roofing membrane 10, which may be 0.045-0.065" thick EPDM rubber, is positioned over the roof convering the anchor discs 14.

The membrane is held to the anchor discs by the second piece of the fastener 12, and a circular tined retainer cap 26. The retainer cap 26 is adapted to fit over and clamp onto the button 16 of the disc 14 with the membrane held between the retainer cap and button 16. The retainer cap 26 includes a flat circular top 27 and an externally threaded cylindrical side wall 28. The interior of the side wall includes a circular, interiorly extending ridge or lip 29 located at the base 31 of the retainer 26. The dimensions of the retainer 26 are established to provide a clearance between the retainer 26 and the wall 17 of button 16 to allow the roofing membrane 10 to fit between the retainer interior and the exterior of the button 16.

The retainer 26 includes a plurality of radially extending slots 32 which extend downwardly from the top 27 of the retainer and through the side wall 28 of the retainer. These slots 32 divide the cylindrical wall 28 of the retainer into a plurality of tines 33. The individual tines 33 can elastically flex outwardly to extend over the top or rim 18 of the button 16 and flex back inwardly so that the ridge 29 of the retainer fits beneath the rim 18 of the button 16.

Accordingly, in order to fasten the roofing membrane 10 to the anchor disc 14, the retainer 26 is simply positioned with the bottom edge 31 resting on the membrane and centered directly above the button 16. The retainer is then forced downwardly over the button. The individual tines 33 flex outwardly, permitting ridge 29 to extend over the top rim 18 of the button 16. As the retainer 26 is pressed further down, the resilient nature of the plastic retainer causes the tines 33 to flex inwardly toward the base 19 of the button 16, tending to return to their original orientation.

Applying this retainer 26 over the membrane 10 can damage the membrane 10. The anchor 14, as well as the tined retainer 26, are formed from a relatively hard plastic, such as a hard polyvinyl chloride. The tined retainer 26 is provided with some flexibility due to the slots 32 cut through the walls 28 and the top 27 of the retainer. But, the material of the tined retainer is still hard enough to cut or abrade the roofing membrane. Therefore, the interior of the tined retainer is coated with a lubricant 34. In order to overcome the need to lubricate the retainer at the work site, the retainer is lubricated with a permanent lubricant which will not evaporate under atmospheric conditions, preferably for as long as the expected life of the roof and at least about ten years. The preferred lubricant is stearic acid although other lubricants such as metal stearates, oil, graphite, silicone or petroleum-based greases or powdered polymers having a low coefficient of friction, such as teflon, can be used. The critical feature with respect to the lubricant is that it must be one which will remain as an effective lubricant on the interior surface of the tined retainer for an extended period of time while not attacking or being absorbed into the sheeting. Further, it must be an effective lubricant even at temperatures substantially less than zero degrees centigrade, i.e., $-10°$ C. to $-20°$ C.

The third piece of the fastener 12 is an internally threaded cover 35. Internally threaded cover 35 is screwed onto the retainer 26. This holds the tines 33 of the retainer 26 in position, preventing the retainer from popping off the button 16 and releasing roof membrane 10. The outer cover 35 further includes a peripheral flange 36 which when screwed down upon the tined cap 26 flattens the roofing membrane against the disc portion 15 of the anchor disc 14. The cover may include two radially extending fins 37 which enable the cover to be grasped and rotated with the hand.

In conclusion, in assembling a roof, anchor discs 14 are fastened at spaced intervals to the roof surface 11 by screw 23 extending through the concave hollow interior 21 of the button 16 of the anchor and through hole 22 and into the roof surface 11. The roof membrane 10 is then positioned over the roof surface and over these anchors 14. The prelubricated tined retainers 26 are individually positioned on the roof membrane above the central buttons 16 of the anchors and are each forced downwardly upon their respective anchors over the buttons thereof. The walls of the tined retainer 26 extend outwardly over the rim 18 of the button 16 with the membrane therebetween. As the retainer 26 is forced downwardly, the tines 33 compress inwardly against the walls 17 of the button, securing the membrane in position. The lubricant 34 on the internal surface of the retainer permits it to slide along the membrane and thereby prevents the retainer from cutting or abrading the membrane. The internally threaded cover 35 is screwed over the retainer 26 and prevents the retainer from popping off of the anchor button 16.

The permanent lubrication of the tined retainer facilitates snapping the retainer 26 onto the button 16, reduces the potential for damaging the membrane, decreases on-site labor requirements by eliminating the need to soak the discs in warm soap water, and permits the use of these fasteners in sub-freezing temperatures. Most importantly, the lubricant remains functional even after the fastener is applied to the membrane, permitting the membrane to slide relative to the fastener. This prevents undesirable localization of stress created when the membrane expands and contracts and/or stretches due to wind-induced uplift forces.

Having described my invention, I claim:

1. A fastener for holding a roofing membrane to a roof without puncturing the roofing membrane comprising:
   an anchoring disc, said disc including a central hollow inverted, frusto-conical button;
   an externally threaded tined retainer cap adapted to snap onto said button of said anchor with said membrane held between said retainer and said button to clamp said membrane to said button;
   a permanent lubricant applied to the internal surface of said tined retainer cap which does not evaporate under atmospheric conditions; and
   an internally threaded cover adapted to screw onto said externally threaded retainer cap to hold said tined retainer cap and button engaged with said membrane gripped therebetween.

2. The fastener claimed in claim 1 wherein said lubricant remains effective at a temperature substantially lower than zero degrees centigrade.

3. The fastener claimed in claim 2 wherein said lubricant is a silicone grease.

4. The fastener claimed in claim 2 wherein said lubricant is a petroleum-based grease.

5. The fastener claimed in claim 1 wherein said lubricant is a graphite-type lubricant.

6. The fastener claimed in claim 1 wherein said lubricant is stearic acid.

7. The fastener claimed in claim 1 wherein said lubricant is a metal stearate.

8. The fastener claimed in claim 1 wherein said lubricant is a powdered polymer having a low coefficient of friction.

9. The method of fastening a roofing membrane to a roof surface without puncturing the roofing membrane comprising:
   fastening an anchoring disc to said surface, said anchoring disc including a central hollow inverted, frusto-conical button;
   positioning said membrane over said anchoring disc;
   lubricating the internal surface of an externally threaded tined retainer cap with a lubricant which remains effective for an extended period of time under atmospheric conditions;
   clamping said membrane to said anchoring disc by forcing said lubricated retainer cap over said button with said membrane between said button and said retainer cap;
   holding said retainer cap engaged with said membrane by screwing an internally threaded cover over said tined retainer.

10. The method claimed in claim 9 wherein said lubricant is a silicone grease.

11. The method claimed in claim 9 wherein said lubricant is a graphite-type lubricant.

12. The method claimed in claim 9 wherein said lubricant is a petroleum-based grease.

13. The method claimed in claim 9 wherein said lubricant is stearic acid.

14. The method claimed in claim 9 wherein said lubricant is a metal stearate.

15. The method claimed in claim 9 wherein said lubricant is a powdered polymer having a low coefficient of friction.

* * * * *